US008909710B2

(12) United States Patent
Blackstock et al.

(10) Patent No.: US 8,909,710 B2
(45) Date of Patent: *Dec. 9, 2014

(54) METHOD FOR DISCOVERING AND DISCRIMINATING DEVICES ON LOCAL COLLABORATIVE NETWORKS TO FACILITATE COLLABORATION AMONG USERS (75) Inventors: Michael A. Blackstock, Coquitlam (CA); Andrew D. Watkins, Vancouver (CA); Henk Spaay, Vancouver (CA); Mathieu P. George, Vancouver (CA); Nicholas J. Sawadsky, Vancouver (CA)

(73) Assignee: Colligo Networks, Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/344,140
(22) Filed: Dec. 24, 2008

(65) Prior Publication Data
US 2009/0187625 A1    Jul. 23, 2009

Related U.S. Application Data (63) Continuation of application No. 11/211,112, filed on Aug. 23, 2005, now abandoned, which is a continuation of application No. 10/043,207, filed on Jan. 14, 2002, now abandoned.

(51) Int. Cl.
G06F 15/16 (2006.01)
H04L 29/08 (2006.01)
H04L 12/18 (2006.01)
H04W 40/24 (2009.01)

(52) U.S. Cl.
CPC ........ H04L 12/1818 (2013.01); H04L 67/1053 (2013.01); H04W 40/246 (2013.01); H04L 67/14 (2013.01); H04L 67/146 (2013.01); H04L 67/104 (2013.01)
USPC ............ 709/205; 709/203; 709/227; 709/228

(58) Field of Classification Search
USPC ......................................... 709/203, 204, 205
See application file for complete search history.

(56) References Cited

U.S. PATENT DOCUMENTS 5,392,400 A    2/1995  Berkowitz et al.
5,493,692 A    2/1996  Theimer et al.
(Continued)

FOREIGN PATENT DOCUMENTS

EP    0588415 A1    3/1994
EP    0798906 A2    10/1997
(Continued)

OTHER PUBLICATIONS

Arnold, K., ""The Jini Architecture: Dynamic Services in a Flexible Network,"" Proceedings in 36th Design Automation Conference, 1999, (ACM 1-58113-109-7/99)."

(Continued)

Primary Examiner — Linglan Edwards
(74) Attorney, Agent, or Firm — Nixon Peabody LLP (57) ABSTRACT A method for identifying participants of a collaborative network is disclosed. The participants communicate over a larger electronic network wherein not all members may be participating in the collaborative session. The method begins by determining a unique session identifier for only the participants of the collaborative network. Next, a message having the session identifier is sent to all members of the network by an inquiring participant of the collaborative network. Only participants that have the session identifier respond to the inquiring participant. Finally, communication is established between the participants that responded to the message and the inquiring participant. In this regard, a collaborative network is formed including the inquiring participant.

17 Claims, 6 Drawing Sheets

(56) References Cited

U.S. PATENT DOCUMENTS

| | | |
|---|---|---|
| 5,737,601 A | 4/1998 | Jain et al. |
| 5,764,982 A | 6/1998 | Madduri |
| 5,790,935 A | 8/1998 | Payton |
| 5,854,893 A | 12/1998 | Ludwig et al. |
| 5,867,799 A | 2/1999 | Lang et al. |
| 5,890,152 A | 3/1999 | Rapaport et al. |
| 5,894,556 A | 4/1999 | Grimm et al. |
| 5,909,183 A | 6/1999 | Borgstahl et al. |
| 5,918,014 A | 6/1999 | Robinson |
| 5,941,945 A * | 8/1999 | Aditham et al. ............. 709/205 |
| 5,987,011 A * | 11/1999 | Toh ................ 370/331 |
| 6,018,738 A | 1/2000 | Breese et al. |
| 6,029,171 A | 2/2000 | Smiga et al. |
| 6,029,191 A | 2/2000 | Kurashima |
| 6,058,106 A | 5/2000 | Cudak et al. |
| 6,061,794 A | 5/2000 | Angelo et al. |
| 6,069,896 A | 5/2000 | Borgstahl et al. |
| 6,078,948 A | 6/2000 | Podgorny et al. |
| 6,108,699 A | 8/2000 | Moiin |
| 6,114,970 A | 9/2000 | Kirson et al. |
| 6,128,647 A | 10/2000 | Haury |
| 6,144,964 A | 11/2000 | Breese et al. |
| 6,148,328 A | 11/2000 | Cuomo et al. |
| 6,167,432 A | 12/2000 | Jiang |
| 6,185,613 B1 | 2/2001 | Lawson et al. |
| 6,185,618 B1 | 2/2001 | Brabson |
| 6,192,394 B1 | 2/2001 | Gutfreund et al. |
| 6,195,091 B1 | 2/2001 | Harple et al. |
| 6,202,094 B1 | 3/2001 | Grosser, Jr. et al. |
| 6,212,549 B1 | 4/2001 | Page et al. |
| 6,237,025 B1 | 5/2001 | Ludwig et al. |
| 6,237,026 B1 | 5/2001 | Prasad et al. |
| 6,256,663 B1 | 7/2001 | Davis |
| 6,259,701 B1 | 7/2001 | Shur et al. |
| 6,269,099 B1 | 7/2001 | Borella et al. |
| 6,282,183 B1 | 8/2001 | Harris et al. |
| 6,289,382 B1 | 9/2001 | Bowman-Amuah |
| 6,295,550 B1 | 9/2001 | Choung et al. |
| 6,295,588 B1 | 9/2001 | Wilson |
| 6,308,175 B1 | 10/2001 | Lang et al. |
| 6,314,420 B1 | 11/2001 | Lang et al. |
| 6,314,448 B1 | 11/2001 | Conner et al. |
| 6,334,141 B1 | 12/2001 | Varma et al. |
| 6,336,134 B1 | 1/2002 | Varma |
| 6,345,264 B1 | 2/2002 | Breese et al. |
| 6,351,762 B1 | 2/2002 | Ludwig et al. |
| 6,353,813 B1 | 3/2002 | Breese et al. |
| 6,358,813 B1 | 3/2002 | Holmes et al. |
| 6,370,562 B2 | 4/2002 | Page et al. |
| 6,421,427 B1 * | 7/2002 | Hill et al. .............. 379/88.14 |
| 6,532,368 B1 * | 3/2003 | Hild et al. ............. 455/515 |
| 6,604,129 B2 | 8/2003 | Slutsman et al. |
| 6,693,886 B1 * | 2/2004 | Haikonen et al. ............. 370/338 |
| 6,748,420 B1 * | 6/2004 | Quatrano et al. ............. 709/205 |
| 6,892,230 B1 * | 5/2005 | Gu et al. ............. 709/220 |
| 7,177,594 B2 * | 2/2007 | Burr ............. 455/41.2 |
| 7,177,910 B1 * | 2/2007 | Bell ............. 709/208 |
| 7,254,237 B1 * | 8/2007 | Jacobson et al. ............. 380/277 |
| 2001/0001268 A1 | 5/2001 | Menon et al. |
| 2001/0002902 A1 | 6/2001 | Hamdi |
| 2001/0017843 A1 | 8/2001 | Yagyu et al. |
| 2001/0025329 A1 | 9/2001 | Sheikh et al. |
| 2001/0027479 A1 | 10/2001 | Delaney et al. |
| 2002/0055973 A1 * | 5/2002 | Low et al. ............. 709/204 |
| 2002/0078150 A1 * | 6/2002 | Thompson et al. ............. 709/204 |
| 2002/0086665 A1 | 7/2002 | Maggenti et al. |
| 2002/0114577 A1 | 8/2002 | Kondo et al. |
| 2002/0167637 A1 | 11/2002 | Burke et al. |
| 2002/0173319 A1 | 11/2002 | Fostick |
| 2002/0196789 A1 | 12/2002 | Patton |
| 2003/0041108 A1 * | 2/2003 | Henrick et al. ............. 709/205 |
| 2003/0101343 A1 * | 5/2003 | Eaton et al. ............. 713/170 |
| 2003/0131141 A1 | 7/2003 | Springmeyer et al. |
| 2003/0226013 A1 | 12/2003 | Dutertre |
| 2004/0125121 A1 | 7/2004 | Pea et al. |
| 2012/0054636 A1 | 3/2012 | Robertson-Hodder |

FOREIGN PATENT DOCUMENTS

| | | |
|---|---|---|
| WO | 0113201 A2 | 2/2001 |
| WO | 0135211 A2 | 5/2001 |
| WO | 0153954 A1 | 7/2001 |

OTHER PUBLICATIONS

"About Universal Plug and Play," Internet: http://www.upnp.org/about/, retrieved on Mar. 14, 2011.

Bary, J. et al., "Bluetooth: Connect Without Cables," Prentice Hall PTR, 2001, pp. 130-142, 191-217, 228-229, 336-338.

"Friday, A. et al., ""Supporting Service Discovery, Querying and Interactionin Ubiquitous Computing Environments,"" ACM MobiDE, 2001, pp. 7-13."

Priyantha, N. et al., "The Cricket Location-Support System," 6th ACM International Conference on Mobile Computing and Networking (ACM MOBICOM), Boston, MA, Aug. 2000.

Office Action in U.S. Appl. No. 10/043,207, mailed Feb. 24, 2005.
Office Action in U.S. Appl. No. 11/211,112, mailed Mar. 31, 2008.
Office Action in U.S. Appl. No. 11/211,112, mailed Jul. 24, 2007.
Office Action in U.S. Appl. No. 11/211,112, mailed Dec. 27, 2006.
Office Action in U.S. Appl. No. 11/211,112, mailed Mar. 27, 2006.

* cited by examiner

METHOD FOR DISCOVERING AND DISCRIMINATING DEVICES ON LOCAL COLLABORATIVE NETWORKS TO FACILITATE COLLABORATION AMONG USERS

CROSS REFERENCE TO RELATED APPLICATIONS

The present application is a continuation of U.S. patent application Ser. No. 11/211,112, entitled "Method for Discovering and Discriminating Devices on Local Collaborative Networks to Facilitate Collaboration Among Users," filed on Aug. 23, 2005 now abandoned, which is a continuation of U.S. patent application Ser. No. 10/043,207, filed Jan. 14, 2002 now abandoned, entitled "Method for Discovering and Discriminating Devices on Local Collaborative Networks to Facilitate Collaboration Among Users."

BACKGROUND OF THE INVENTION

The present invention generally relates to identifying members of a collaborative network and more particularly to a method of identifying members in a peer-to-peer network without the use of a central server.

In a peer-to-peer network or system, users would like to collaborate using their computing devices in a public or private collaboration session without the use of a server. Collaboration may involve the transfer of files, sending messages, or other forms of data between two or more computing devices of the network. During collaboration, the computing devices share a physical network with other devices who the users may wish to selectively include or exclude from their sessions.

Typically, a network has a central designated server that can identify users and the current network addresses or device identifiers of their devices which are currently logged-in as well as the session identifiers which are used to distinguish specific collaboration sessions. A collaboration session may correspond to an active group of collaboration participants or a team of participants in a virtual room/physical location for collaboration. When the user logs in, the central server can provide the user's computing device a list of network addresses for the other devices who share the same session identifier and exclude those who are not in the desired session.

Without a central server, it is extremely difficult to maintain an accurate accounting of the participants in the collaborative session. The computing device of the user does not have access to a central list which can be used to identify participants. There is no central mechanism for the addition and removal of participants. Accordingly, the computing device of the user will not be able to quickly and easily contact all members of the collaborative session because they are not identifiable to the user.

The Jini architecture provides an infrastructure for defining, advertising and finding services on a network where services are defined by Java interfaces or classes. Advertisement is done using a lookup service, which is a place for services to advertise their presence on a network. Generally devices use Jini protocols to find lookup servers, then query found lookup servers using Jini to find services which may exist on other network devices: Accordingly, the lookup service may not exist on the same device as the services advertised, nor does the Jini itself provide information that can be used for collaboration.

Another type of location protocol is UPnP which is similar to the Jini protocol. UpnP uses multicast messaging to request the existence of services. Only those servers that can provide a requested service or that know of servers who can provide such a service respond. The individual collaborative services do not respond. Accordingly, in order to utilize the UpnP service, a server must be present on the network.

U.S. Pat. No. 6,069,896 entitled "Capability Addressable Network And Method Therefor" describes the connection protocol for members in a peer to-peer network. The '896 patent addresses the problems associated with trying to connect and authenticate other peers on a peer-to-peer network. However, the '896 patent does not disclose how to identify and locate other peers when collaboration between peers is necessary. Furthermore, the connection protocol described by the '896 patent is extremely bandwidth intensive such that it would not be suitable for the identification of collaborative devices on a peer-to-peer network.

Similarly, U.S. Pat. No. 6,282,183 entitled "Method For Authorizing Couplings Between Devices In A Capability Addressable Network" discloses the methods and protocols for authorizing coupling between devices in a capability-addressable network. However, the '183 patent does not disclose how peers can be quickly and easily identified on the network. In fact, the '183 patent discloses how a device accesses network services.

The present invention addresses the above-mentioned deficiencies in identification of users in a peer-to-peer network by providing a method in which a user can identify the network addresses of other users without the use of a central server. Accordingly, the present invention allows collaboration between computing devices where the network address (such as an IP address) and devices used by a user are not known in advance and may change.

BRIEF SUMMARY OF THE INVENTION

In accordance with the present invention, there is provided a method for identifying participants of a collaborative network. The participants communicate over a larger electronic network wherein not all members may be participating in the collaborative session. The method begins by determining a unique session identifier for only the participants of the collaborative network. Next, a message having the session identifier is sent to all members of the network by an inquiring participant of the collaborative network. Only participants that have the session identifier respond to the inquiring participant. Finally, communication is established between the participants that responded to the message and the inquiring participant. In this regard, a collaborative network is formed including the inquiring participant and excluding others on the larger network.

The method of identifying participants further includes the step of creating a participant list of the members of the collaborative network which can be stored by the participants. The participant list includes all of the participants of the collaborative network which have the same session identifier.

The participants can be computing devices such as PDA's, computers or other electronic devices. In this regard, the collaborative network is an electronic network that is capable of transmitting and receiving messages to and from computing devices. Typically, the collaborative network is a wired or wireless network. The message having the session identifier is a UDP datagram containing the session identifier. The UDP datagram may be a broadcast or multicast datagram.

In accordance with the present invention, there is provided a system for identifying members of a collaborative network.

The system comprises at least two computing devices in electronic communication with one another. Furthermore, the system includes a unique session identifier for distinguishing members of the collaborative network from other members of the network. The system further includes an identification message having the unique session identifier. The identification message is sent between at least two computing devices such that if the session identifier is identical between the two devices, then the devices are members of the collaborative network. Of course, it will be realized that multiple devices may be in electronic communication with one another such that only those devices which have the unique session identifier are members of the collaborative network.

BRIEF DESCRIPTION OF THE DRAWINGS

These, as well as other features of the present invention will become more apparent upon reference to the drawings wherein.

DETAILED DESCRIPTION OF THE INVENTION

Figure 1:
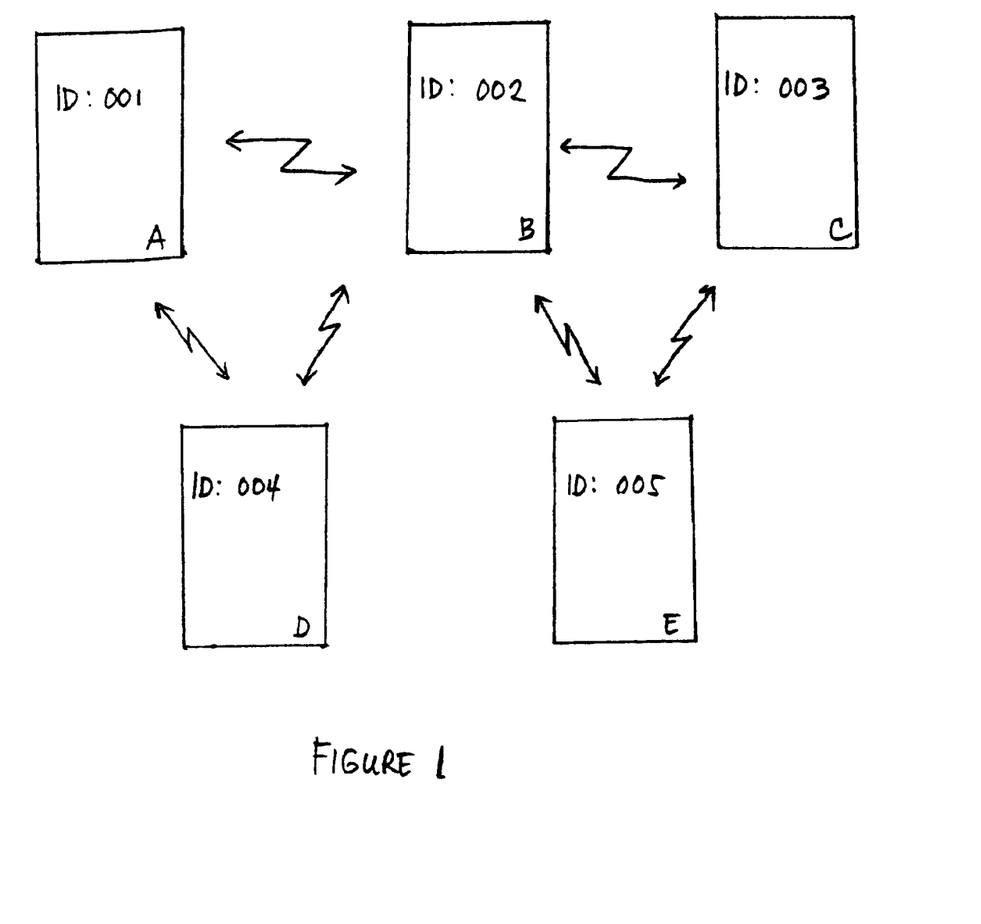
FIG. 1 is a diagram depicting computing devices on a network for collaboration.

Referring now to the drawings wherein the showings are for purposes of illustrating a preferred embodiment of the present invention only, and not for purposes of limiting the same, FIG. 1 illustrates computing devices A, B, C, 13, and E in a peer-to-peer network. The computing devices may be PDA's, PC's, wireless telephones, or any other type of electronic device that can be in a network. The network may be wired (i.e, LAN or Ethernet) or wireless network (i.e., Bluetooth, 802.11b). The present invention is independent of the type of the computing device or the type of network.

Each of the computing devices A, B, C, D, and E has a respective network identification number. For instance, computing device A has a network identification number of 001. The network identification number is a unique identifier to the network. Furthermore, each computing device may also have an associated network address. The address may be an IP address or other type of network specific address. In some instances the network identification number and the network address may be the same unique identifier for the computing device.

Referring to FIG. 1, it is possible to see that computing device A is in direct network communication with devices B and D. Similarly, computing device C is in communication with devices B and E. It is possible for computing device A to indirectly communicate with computing device C by utilizing the connection with computing device B. Accordingly, it is possible for computing devices A and C to collaboratively share information by utilizing their connectivity with device B.

Figure 2:
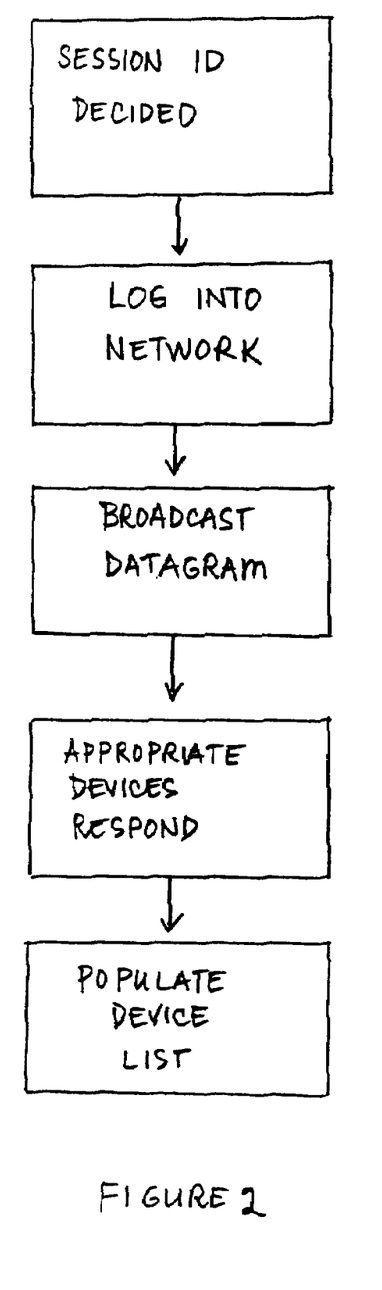
FIG. 2 is a flowchart illustrating how the computing devices shown in FIG. 1 are identified in a collaborative session.

Referring to FIG. 2, a method of identifying computing devices in a collaborative network according to the present invention is shown. The method begins by the device accessing and logging into the network via commonly known techniques. Next, the device that has just accessed the network will send out a broadcast or multicast datagram containing the network identification of the device, as well as a session identifier, to all potential participant devices on the network. If an appropriate receiving device is a member of the same session, then the device will recognize the session identifier and respond with the identification of the computing device and the network address of the device. However, if a computing device is not a member of the group, the computing device will not respond. Finally, the inquiring device would generate or populate a list of devices that are in the same session as the device so that collaboration can occur.

Using FIG. 1, an example of how the devices communicate will now be described. For example, assume that devices A, B, and C wish to collaborate but want to exclude devices D and E on the network. All of the devices (i.e, A, B, C, D, and E) are on the same network and can communicate with each other using broadcast or multicast messages and directed packets. As previously discussed, any type of wired or wireless network can be used.

The user's of devices A, B, and C agree on the ID of their session by choosing a name which can be turned into a unique session ID using any type of algorithm. Alternatively, the session ID can be the name itself. For instance, the session ID may be the name of the company, a department or group, the name of a location, or the purpose of the collaboration session. The agreement for the session ID can occur before or after the computing devices are logged onto the network. For instance, the users of the devices can decide on the unique session ID by other means of communication such as telephone, email, or face to face discussion. However, the user's of devices D and E are not told and do not know the name of the session ID.

Once the user of device A has logged into the network, the user will enter the name of the session ID into computing device A. If the name of the session is not the session ID, then computing device A will use the appropriate algorithm to derive the session identifier. Once the session ID has been established, then device A will send a broadcast message containing the appropriate session identifier to every device on the network (i.e., devices B, C, D, and E). The other devices receive the broadcast message (i.e., packet) and examine it. At this point none of the other user's of the devices on the network have entered the appropriate session M. Accordingly, because none of the other devices recognize the session ID, none of the devices respond. By using the session ID in the broadcast message, bandwidth is saved and scalability is increased. The session ID in the query considerably reduces the number of responses and traffic because authentication begins immediately once a response is received by a collaborating device of the same session.

Next, the user of device B enters the name of the session on device B which derives the corresponding session 1a Once the session ID has been entered, device B sends a broadcast message to the other devices on the network (i.e., devices A, C, D, and E). Device A recognizes the session ID and responds with the device ID and/or network address. Of course, devices C, D, and E do not recognize the session ID and do not respond to device A. Then, device A populates a collaboration session device/user list with the ID and/or network address of device B. Similarly, device B populates its collaboration session' device/user list with the ID and/or network address of device A. As such, device A and device B can collaborate over the network without intrusion by the other devices.

If the user of device C wishes to join the collaboration session, then the user will enter the appropriate session name into device C which derives the corresponding session ID. Once entered, device C will send a broadcast message to all of the devices. Devices A, B, D and E will receive the packet and only devices A and B will recognize the session ID and respond with the device and/or network address. Accordingly, device A and device B populate their respective device lists with the information from device C. Similarly, device C populates its device list with the information from devices A and B in order to form a collaborative network between devices A, B, and C, while still excluding devices D and E.

Figure 3:
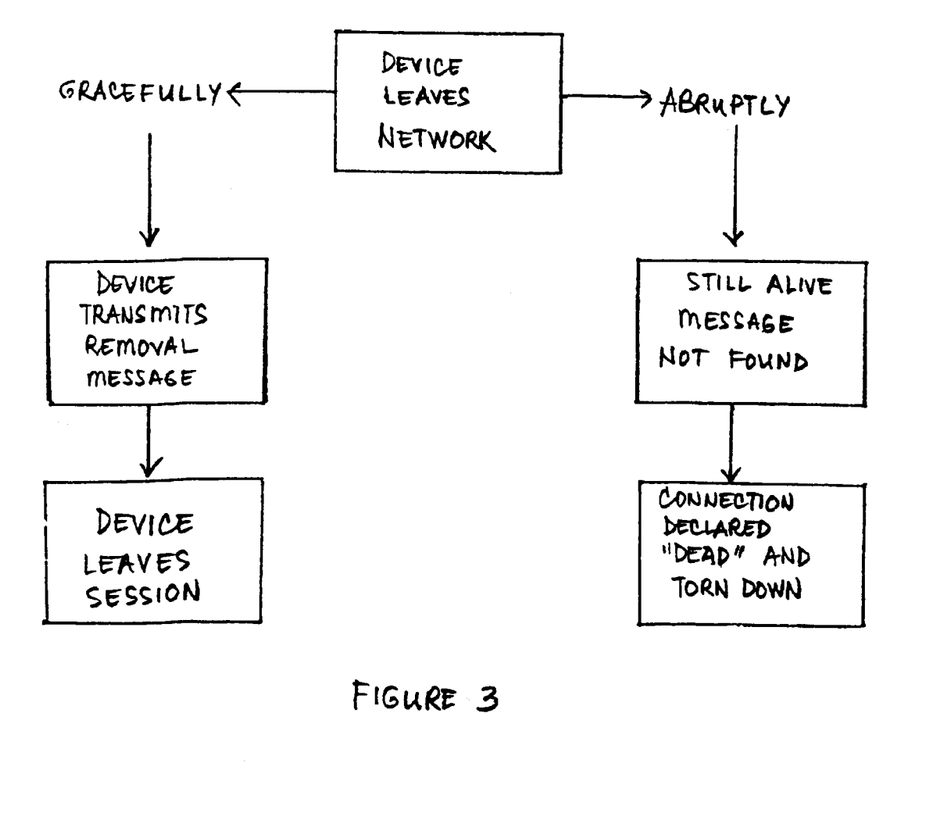
FIG. 3 is a flowchart illustrating how a computing device is removed From a collaborative session.

Referring to FIG. 3, several mechanisms are illustrated for a computing device leaving the collaborative session. In the first instance a computing device can leave the network gracefully inasmuch as it doesn't crash. The device leaving the network will send a message to all of the devices connected to the network using either a connection oriented protocol or a datagram. The message will declare that the device is leaving the network and that the remote peer is offline. Once the message has been sent, each of the devices that are members of the session can appropriately update their device lists by removing the device that left the network.

On the other hand, sometimes the network connection may be terminated abruptly such as when the network connection is physically broken, the exit datagram is lost, or the remote peer goes out of range on a wireless network. Accordingly, it is not possible to send or receive a message indicating that the device has left the session.

In order to account for this type of event, each device should be equipped to periodically send a "still alive" message to each connected device. For example, each device in the network could send a message every ten seconds to the other devices indicating that the device is still on the network. The "still alive" message could be a connectionless datagram or a message sent using a connection protocol between the devices.

If a device does not detect or receive a "still alive" message from another device of the network for more than twice a determined interval, then the device is declared offline and the connection is torn down. Furthermore, the device declared offline is removed from the device list. For example, referring to FIG. 1, if device A does not receive a "still alive" message for more than two intervals of the message being sent (i.e., 20 seconds), then device A will declare device B offline and remove device B from the device list.

Figure 4:
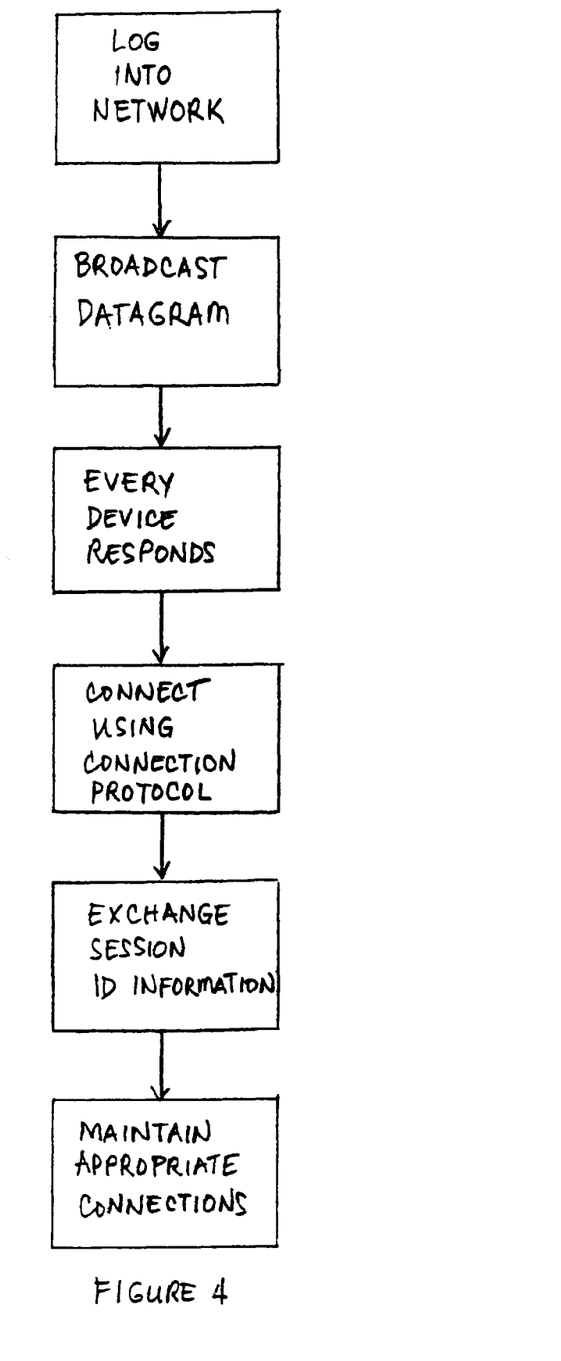
FIG. 4 is a flow chart illustrating another method of how a computing device is identified in a collaborative session.

Referring to FIG. 4, another method of identifying members of a collaborative network is shown. In this instance, the session identifier is not included in the broadcast or multicast datagram. The device will first log into the network. Next, the initiating device will transmit a broadcast or multicast datagram that does not include the session identifier. Every device that is active on the network will then respond to the datagram. Next, the initiating device will connect to every responding device using a connection oriented protocol such as TCP to exchange messages relating to which session a device is a member. The connection can then be dropped or maintained as necessary. For instance, all of the devices which have the same session identifier as the initiating device will have their connection maintained. If the connection is maintained, all future messages regarding session changes, exiting the network, or "keep alive" messages can then be sent using a reliable connection oriented protocol. This method can be further extended to support multiple networks or IP subnets by forwarding the multicast or broadcast packets to receivers in another network/subnet which can then multicast or broadcast the packets.

Furthermore, the above-mentioned process can be combined with an authentication protocol to ensure that the device is actually a member of the session. An additional protocol can then be used between peers to ensure that peers recognize each other. A password or shared key could be used for authentication. Alternatively, public key cryptography could be used where each device contains the keys of all possible collaborators and is used to authenticate other users. Once the device has been verified to be a member of the session, then the device can connect to other devices in the same session with a protocol like TCP in a peer-to-peer manner for collaboration.

Another instance of identification can occur when a network does not exist between devices, but the devices can communicate over some other type of connection. Accordingly, a connection could be set up initially between the devices to determine if session identifiers match. For example, a "client" device connects to a "server" device using some variant of a radio inquiry/response. The "client" then asks the "server" for the collaboration session ID to which the "server" will respond. If the session II) matches, the "client" remains connected and authenticates the session ID in order to collaborate with the "server". This could be implemented with devices communicating over a Bluetooth network.

Figure 5:
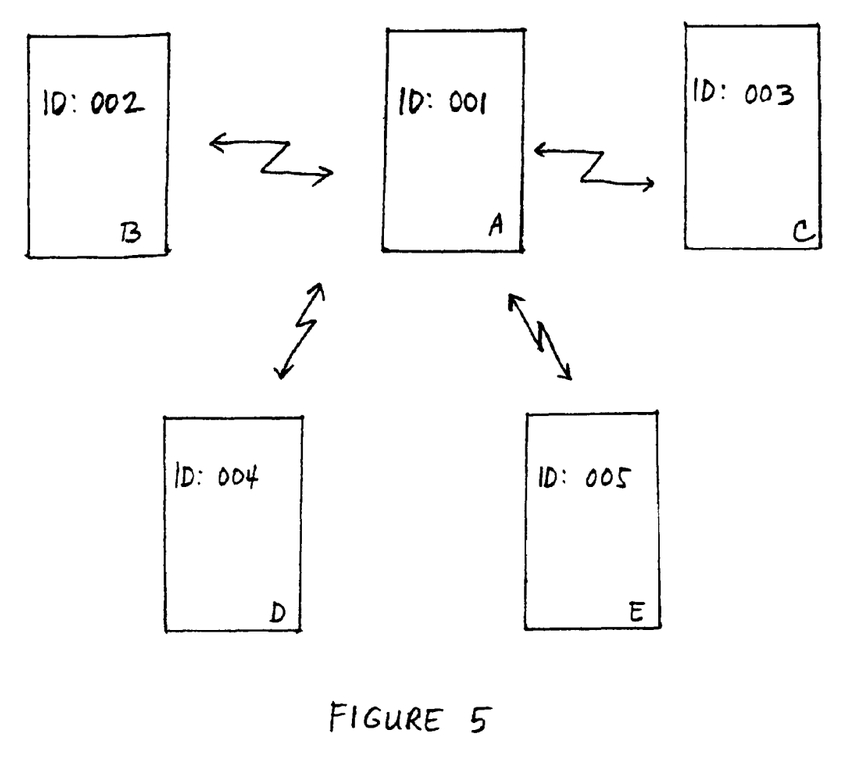
FIG. 5 is a diagram depicting computing devices on a personal area network for collaboration.

Referring to FIG. 5, the identification method of the present invention can be utilized with a Personal Area Network (PAN). For example, a PAN network consists of a central master device A and slave devices B, C, D, and E connected in a star shaped topology. The master device A is responsible for forwarding unicast, multicast, and broadcast packets as required by the PAN. A device in the PAN, can respond on behalf of other devices such that each device is either designated as a master or slave device. A master is first created on the PAN with no other devices connected to it, and devices are designated as slaves as they join the PAN.

For the identification of devices according to the present invention, after a slave device connects to the PAN, the slave device sends an inquiry message in a broadcast or multicast datagram containing the session identifier and the user identifier to all potential participant devices in the network. The master device receives the broadcast datagram and, as will be further explained below, does not need to forward the datagram thereby saving bandwidth. The master will save the session ID and network address from the inquiry for future use. Next, the master will retrieve previously saved network address/session information from previous requests. In this regard, the master will contain network/session information about all of the slave devices. The master will reply to the inquiry (i.e., broadcast or multicast datagram) with a list of the network ID's that match the session 11) requested. The slave will use this information to begin a collaborative session with the devices that have matching session ID's. In order to save bandwidth in the network, the master will save and respond to all inquiry requests from the slave devices. In this manner, slaves who disconnect can then inform only the master who can then delete the network ID/session information from its list and notify the other connected slave devices.

Figure 6:
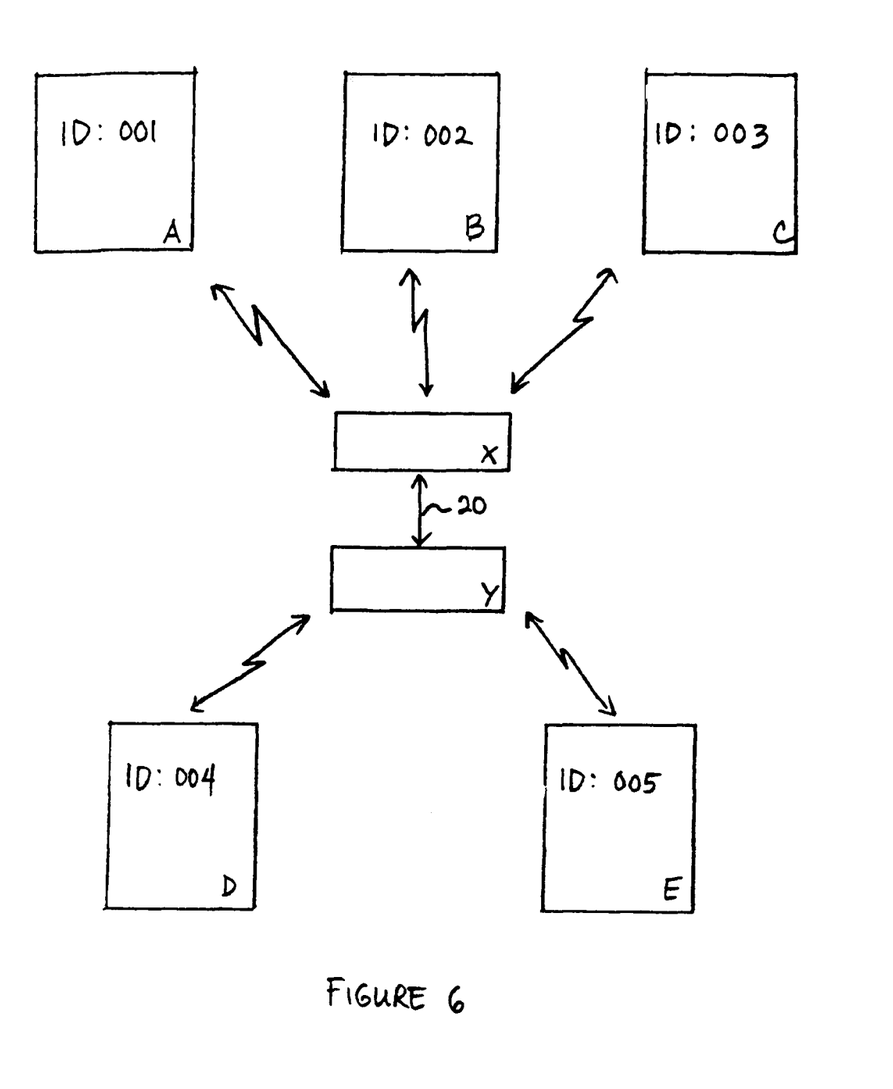
FIG. 6 is a diagram depicting computing devices utilizing access points in a network for a collaborative session.

The technique of the present invention can also be used to identify other devices in the same local area for collaboration without the need of a server. Referring to FIG. 6, computing devices A, B, and C can access network 20 through access point X. Similarly, computing devices D and E access network 20 through access point Y. Each of the devices stores the access point identifier (i.e., X or Y) after it connects. As the devices move, they store the ID's of the closest access point.

In order to identify participants near a desired device, the inquiring device sends a broadcast or multicast message containing the access point identifier instead of session ID information. Only those devices which have the same access point identifier will respond thereby identifying those devices which are nearby. For instant, referring to FIG. 6, if device A sends out an inquiry, only devices B and C will respond. This technique is useful for identifying participants that are in range of a wireless network. Additionally, instead of using access point identifiers, physical "beacon" identifiers can be used.

In addition to the foregoing, it is also contemplated that the above-mentioned method could be used with a designated responder for a session. When a computing device transmits a session identifier request to a designated responder, the responder would reply with information about all of the other devices with the same session ID. Accordingly, the other devices would not need to respond thereby reducing bandwidth usage.

Furthermore, to reduce bandwidth, when a device joined or rejoined a network it could attempt to connect to a previous member of the team first. If found, the device could ask the found member for the information about other collaborative devices. If the previous member is not in the session, then the device would utilize the broadcast/multicast messaging as previously described above.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

The invention claimed is:

1. A computer implemented method comprising:
at a first peer computing device in a peer-to-peer network, sending a multicast message to at least two additional peer computing devices on an Internet Protocol (IP)-connected subnet, the multicast message comprising a session identifier, the session identifier derived from a session name based on user prior to establishing a new collaborative network;
responsive to the sending, receiving a unicast message from at least a plurality of the at least two additional peer computing devices on the IP-connected subnet having the same session identifier, each of the unicast messages comprising:
an IP address, or an address resolvable to an IP address, of the additional peer computing device; and
other identification of the additional peer computing device; and
updating or populating a list at the first peer computing device identifying peer computing devices that have the same session identifier including at least the plurality that have responded to indicate the IP address or address resolvable to the IP address and the other identification of the plurality of peer computing devices in order to establish the new collaborative network that includes each of the plurality of peer computing devices that have responded.

2. The method of claim 1, further comprising periodically sending a message to the subnet to announce the presence of the first peer computing device.

3. The method of claim 1, further comprising the first peer computing device broadcasting a message announcing a departure of the first peer computing device from the subnet.

4. The method of claim 1, further comprising:
the first peer computing device maintaining a record of an interval since a last message from a peer computing device other than the first peer computing device; and
when a pre-determined threshold is exceeded for the interval, removing the peer computing device other than the first peer computing device from the list.

5. The method of claim 1 wherein the subnet is a wireless ad-hoc network.

6. The method of claim 1 wherein the identifier is pre-determined by a software configuration of the first peer computing device.

7. The method of claim 1, further comprising:
periodically sending a message to the subnet to announce the presence of the first peer computing device;
the first peer computing device broadcasting a message announcing a departure of the first peer computing device from the subnet;
the first peer computing device maintaining a record of an interval since a last message from a peer computing device other than the first peer computing device; and
when a pre-determined threshold is exceeded for the interval, removing the peer computing device other than the first peer computing device from the list;
wherein the subnet is a wireless ad-hoc network and the identifier is pre-determined by a software configuration of the first peer computing device.

8. The method of claim 1, further comprising:
periodically sending a message to the subnet to announce the presence of the first peer computing device;
the first peer computing device broadcasting a message announcing a departure of the first peer computing device from the subnet;
the first peer computing device maintaining a record of an interval since a last message from a peer computing device other than the first peer computing device; and
when a pre-determined threshold is exceeded for the interval, removing the peer computing device other than the first peer computing device from the list;
wherein the identifier is pre-determined by a software configuration of the first peer computing device.

9. An apparatus comprising:
a memory;
an interface configured to communicate with a peer-to-peer network; and
one or more processors configured to:
send a multicast message to at least a plurality of additional peer computing devices on an Internet Protocol (IP)-connected subnet, the multicast message comprising a session identifier, the session identifier derived from a session name based on user input, the apparatus comprising a first peer computing device on the IP-connected subnet;
responsive to the sending, receive a unicast message from at least a plurality of the at least two additional peer computing devices on the IP-connected subnet having the same session identifier, the unicast message comprising:
an IP address, or an address resolvable to an IP address, of the additional peer computing device; and
other identification of the additional peer computing device; and
update or populate a list at the first peer computing device identifying peer computing devices that have the same session identifier including at least the plurality that have responded to indicate the IP address or address resolvable to the IP address and the other identification of the additional peer computing device in order to establish a new collaborative network that includes each of the plurality of peer computing devices that have responded.

10. The apparatus of claim 9 wherein the one or more processors are further to periodically sending a message to the subnet to announce the presence of the first peer computing device.

11. The apparatus of claim 9 wherein the one or more processors are further to broadcast a message announcing a departure of the first peer computing device from the subnet.

12. The apparatus of claim 9 wherein the one or more processors are further to:
    maintain a record of an interval since a last message from a peer computing device other than the first peer computing device; and
    when a pre-determined threshold is exceeded for the interval, remove the peer computing device other than the first peer computing device from the list.

13. The apparatus of claim 9 wherein the subnet is a wireless ad-hoc network.

14. The apparatus of claim 9 wherein the identifier is pre-determined by a software configuration of the first peer computing device.

15. The apparatus of claim 9 wherein the one or more processors are further to:
    periodically send a message to the subnet to announce the presence of the first peer computing device;
    broadcast a message announcing a departure of the first peer computing device from the subnet;
    maintain a record of an interval since a last message from a peer computing device other than the first peer computing device; and
    when a pre-determined threshold is exceeded for the interval, remove the peer computing device other than the first peer computing device from the list;
    wherein the subnet is a wireless ad-hoc network and the identifier is pre-determined by a software configuration of the first peer computing device.

16. The apparatus of claim 9 wherein the one or more processors are further to:
    periodically send a message to the subnet to announce the presence of the first peer computing device;
    broadcast a message announcing a departure of the first peer computing device from the subnet;
    maintain a record of an interval since a last message from a peer computing device other than the first peer computing device; and
    when a pre-determined threshold is exceeded for the interval, remove the peer computing device other than the first peer computing device from the list;
    wherein the identifier is pre-determined by a software configuration of the first peer computing device.

17. A nontransitory computer-readable medium comprising a program of instructions for execution and when executed operable to:
    at a first peer computing device in a peer-to-peer network, sending a multicast message to at least two additional peer computing devices on an Internet Protocol (IP)-connected subnet, the multicast message comprising a session identifier, the session identifier derived from a session name based on user input-prior to establishing a new collaborative network;
    responsive to the sending, receiving a unicast message from at least a plurality of the at least two additional peer computing devices on the IP-connected subnet having the same identifier, each of the unicast messages comprising:
        an IP address of the additional peer computing device and
        other identification of the additional peer computing device; and
    updating or populating a list at the first computing device identifying peer computing devices that have responded to indicate the IP address or address resolvable to the IP address and the other identification of the additional peer computing devices in order to establish the new collaborative network that includes each of the plurality of peer computing devices that have responded.

* * * * *